United States Patent

[11] 3,631,410

[72] Inventor Bruce M. Velasco
Goleta, Calif.
[21] Appl. No. 873,529
[22] Filed Nov. 3, 1969
[45] Patented Dec. 28, 1971
[73] Assignee General Motors Corporation
Detroit, Mich.

[54] EVENT RECORDER
2 Claims, 3 Drawing Figs.

[52] U.S. Cl. .......... 340/173 SP, 307/238, 307/317
[51] Int. Cl. .......... G11c 11/36
[50] Field of Search .......... 340/173 SP; 307/317

[56] References Cited
UNITED STATES PATENTS

| | | | |
|---|---|---|---|
| 3,028,659 | 4/1962 | Chow et al. .......... | 340/173 |
| 3,445,823 | 5/1969 | Peterson .......... | 340/173 |

*Primary Examiner*—Terrell W. Fears
*Attorneys*—W. W. Christen, C. R. Meland and Tim G. Jagodzinski

ABSTRACT: An apparatus is provided for recording a signal voltage as a function of magnitude and time. The apparatus includes a memory matrix comprising a plurality of diodes connected between different ones of a series of magnitude drive lines and a series of time drive lines. A magnitude input circuit is connected with the magnitude drive lines for applying a drive voltage to different ones of the drive lines as a function of the magnitude of the signal voltage. A time input circuit is connected with the time drive lines for coupling different ones of the drive lines to a reference voltage point as a function of time. The drive voltage is substantially greater than the peak voltage rating of the diodes. Therefore, as the drive voltage is applied to the selected ones of the magnitude drive lines and as selected ones of the time drive lines are coupled to the reference voltage point, the diodes connected between the selected ones of the magnitude and time drive lines are burned out or open circuited by the drive voltage. Hence, the pattern of open circuited diodes within the memory matrix provides a representation of the magnitude of the signal voltage as a function of time.

INVENTOR.
Bruce M. Velasco
BY
Ince G. Jagodzinski
ATTORNEY

Patented Dec. 28, 1971 3,631,410

2 Sheets-Sheet 2

INVENTOR.
Bruce M. Velasco
BY
Tine G. Jagodzinski
ATTORNEY

EVENT RECORDER

This invention relates to a voltage recorder and more particularly to a system for recording an event which may be represented by a voltage expressed as a function of magnitude and time.

According to one aspect of the invention, a signal voltage is recorded as a function of magnitude and time in a semiconductor medium. In general, this is accomplished by providing a memory matrix comprising a plurality of rectifier junction devices or diodes, each connected between a different one of a series of magnitude drive lines and a different one of a series of time drive lines. A drive voltage is applied across certain ones of the diodes through selected ones of the magnitude and time drive lines. The diodes connected between the selected ones of the magnitude and time drive lines are burned out or open circuited by the drive voltage which is greater than the peak voltage rating of the diodes.

In another aspect of the invention, the magnitude drive lines are selected as a function of the magnitude of the signal voltage, and the time drive lines are selected as a function of the total elapsed time. In general, this is accomplished by providing a magnitude input circuit connected with the magnitude drive lines and a time input circuit connected with the time drive lines. The magnitude input circuit applies a drive voltage to different ones of the magnitude drive lines in response to different predetermined levels of the signal voltage. The time input circuit couples different ones of the time drive lines to a reference voltage point in response to different predetermined time intervals. Thus, the pattern of open circuited diodes within the memory matrix represents the signal voltage expressed as a function of magnitude and time.

According to yet another aspect of the invention, the entire voltage recorder may be constructed in accordance with semiconductor integrated circuit techniques. The construction yields two important advantages. First, the operating speed of the voltage recorder may be as fast as permitted by current semiconductor electronic technology. Hence, the recorder may be employed to measure signal voltages of very short duration. Second, the physical size of the voltage recorder may be as small as permitted by present integrated circuit technology. Thus, the recorder may be employed in a wide variety of applications requiring location in a very small space.

Figure 1:
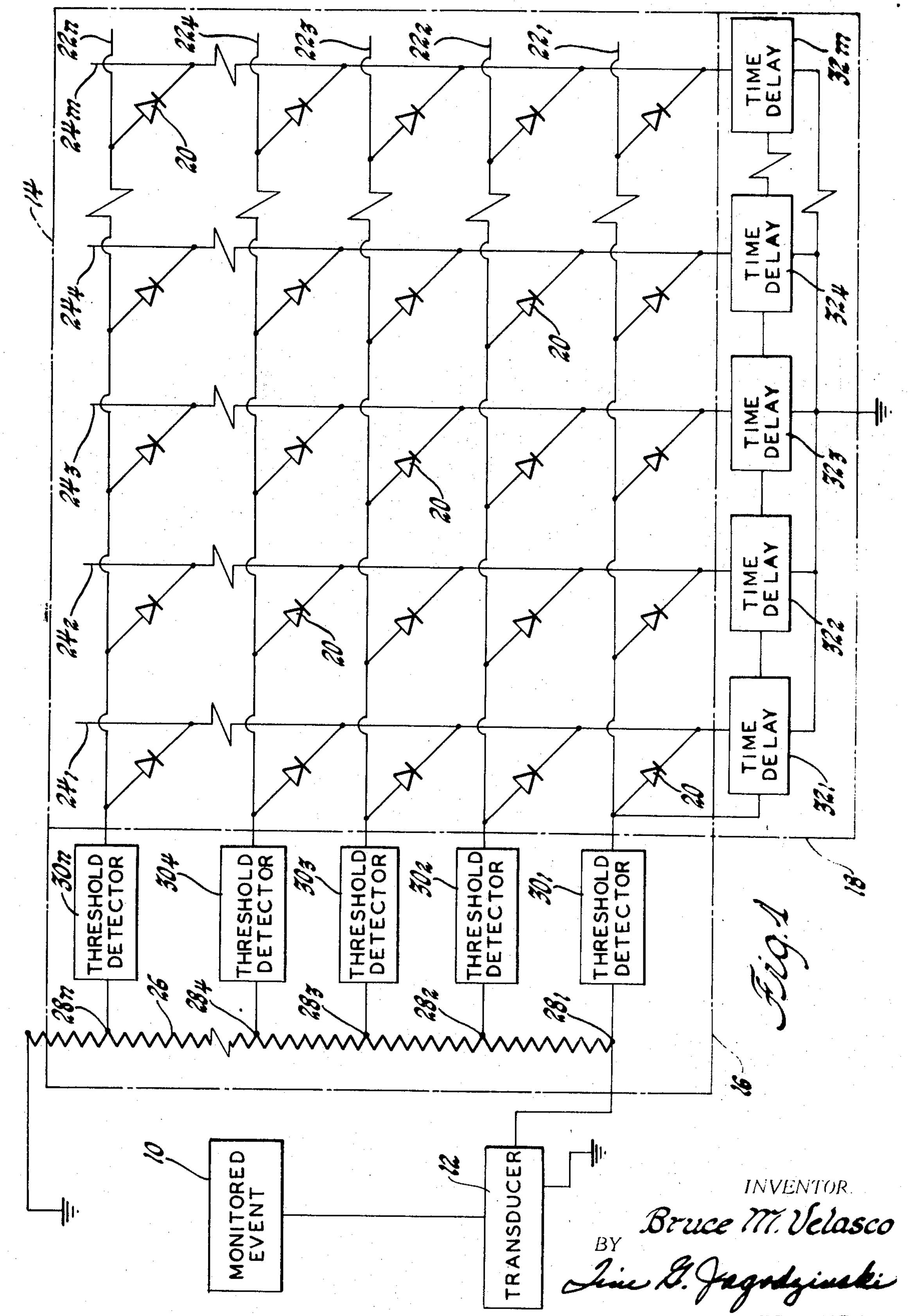

These and other aspects and advantages of the invention will become more apparent by reference to the following detailed description of a preferred embodiment as illustrated in the accompanying drawing, in which:

FIG. 1 is a schematic diagram of an event recording apparatus incorporating the principles of the invention.

Figure 2A:
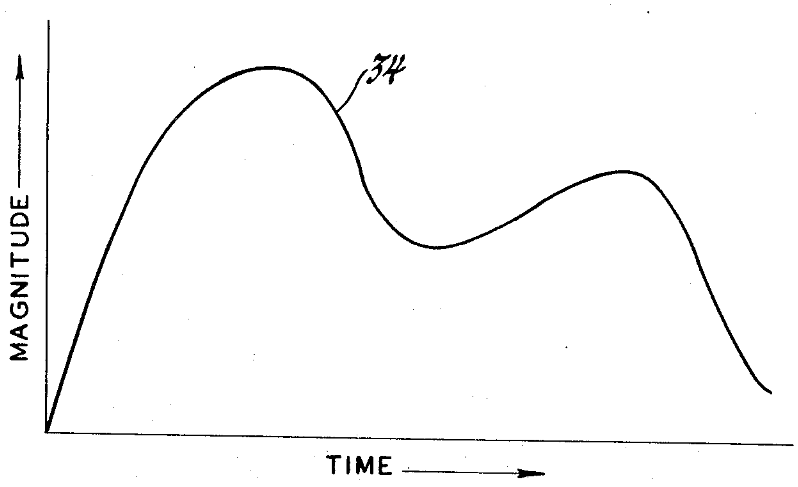
Figure 2B:
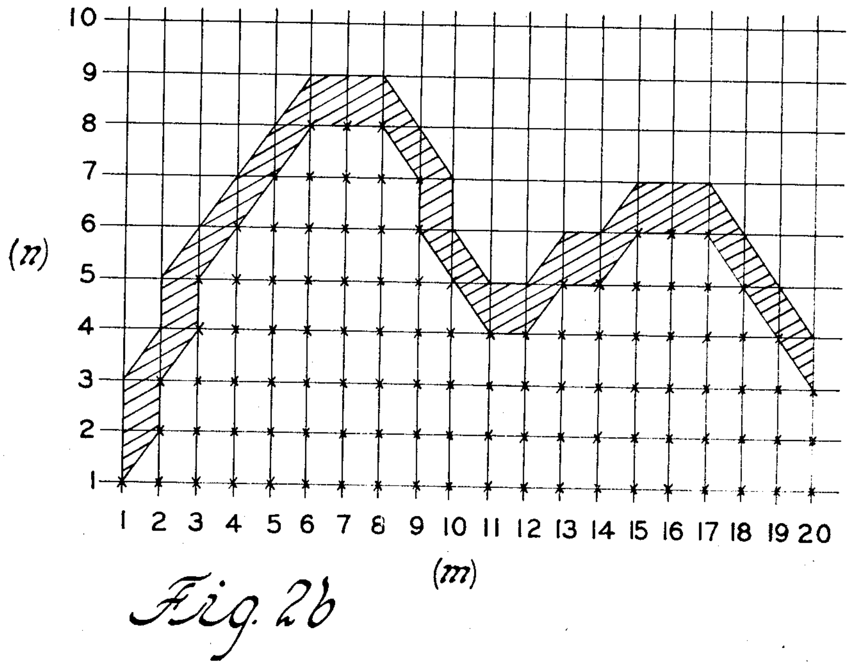

FIGS. 2 and 2*b* are a pair of graphs useful in explaining the operation of the recording apparatus illustrated in FIG. 1.

Referring to FIG. 1, an apparatus is disclosed for recording a monitored event 10 as a function of magnitude and time. A transducer 12 is responsive to the monitored event 10 to provide a signal voltage having a level which corresponds to the magnitude of the monitored event 10. As an example, the monitored event 10 may be the impact of a moving object against a stationary object. In such case, the transducer 12 may be an accelerometer for producing a signal voltage having a level which corresponds to the magnitude of the deceleration of the moving object due to the impact with the stationary object. However, it is to be understood that the monitored event 10 may be virtually any phenomena exhibiting a magnitude which may be represented by the level of a signal voltage produced by the transducer 12.

The illustrated event recording apparatus includes a recording medium or memory matrix 14 which is simultaneously driven by a magnitude input circuit 16 and a time input circuit 18 so as to record the representation of the signal voltage as a function of magnitude and time. The memory matrix 14 comprises a plurality of rectifier junction devices, provided by diodes 20, which are connected between a different one of a series of magnitude drive lines $\mathbf{22}_1$–$\mathbf{22}_n$ and a different one of a series of time drive lines $\mathbf{24}_1$–$\mathbf{24}_m$. The diodes 20 each include an anode electrode and a cathode electrode. The anode electrodes are connected to the magnitude drive lines $\mathbf{22}_1$–$\mathbf{22}_n$ while the cathode electrodes are connected to the time drive lines $\mathbf{24}_1$–$\mathbf{22}_m$.

The magnitude input circuit 16 includes a sensing resistor 26 having a plurality of different voltage taps $\mathbf{28}_1$–$\mathbf{28}_n$. The sensing resistor 26 is connected between the output of the transducer 12 and a reference voltage point indicated as ground. Thus, the signal voltage produced by the transducer 12 appears across the sensing resistor 26. In addition, the magnitude input circuit 16 includes a plurality of threshold detector devices $\mathbf{30}_1$–$\mathbf{30}_n$ which are each sensitive to a specific input voltage to provide a particular output voltage. The threshold detector devices $\mathbf{30}_1$–$\mathbf{30}_n$ each include an input connected to the sensing resistor 26 at a different associated one of the voltage taps $\mathbf{28}_1$–$\mathbf{28}_n$. Further, the threshold detector devices $\mathbf{30}_1$–30 each include an output connected to a different associated one of the magnitude drive lines $\mathbf{22}_1$–$\mathbf{22}_n$. Thus, the threshold detector devices $\mathbf{30}_1$–$\mathbf{30}_n$ are each responsive to a different predetermined level of the signal voltage appearing at the high-voltage end of the resistor 26 to apply a drive voltage to the associated one of the magnitude drive lines $\mathbf{22}_1$–$\mathbf{22}_n$.

Preferably, the voltage taps $\mathbf{28}_1$–$\mathbf{28}_n$ are distributed along the length of the sensing resistor 26 at points successively nearer the low-voltage end of the resistor 26 so that the threshold detector devices $\mathbf{30}_1$–$\mathbf{30}_n$ are responsive to successively greater levels of signal voltage appearing at the high-voltage end of the resistor 26. It will be appreciated that the increments at which the voltage taps $\mathbf{28}_1$–$\mathbf{28}_n$ are provided along the length of the sensing resistor 26 may be adjusted so as to produce any desired magnitude scale in the memory matrix 14, as for example a linear or a logarithmic magnitude scale. For reasons which will be more fully explained later, the drive voltage applied by the threshold devices $\mathbf{30}_1$–$\mathbf{30}_n$ to the magnitude drive lines $\mathbf{22}_1$–$\mathbf{22}_n$ is substantially in excess of the peak voltage rating of the diodes 20. The threshold detector devices $\mathbf{30}_1$–$\mathbf{30}_n$ may be provided by any suitable voltage responsive devices, such as transistors, Zener diodes, or even ordinary resistors.

The time input circuit 18 includes a plurality of time delay devices $\mathbf{32}_1$–$\mathbf{32}_m$ each connected between a different associated one of the time drive lines $\mathbf{24}_1$–$\mathbf{24}_m$ and a voltage reference point indicated at ground. Further, the time delay devices $\mathbf{32}_1$–$\mathbf{32}_m$ are interconnected together, with the input of the time delay device $\mathbf{32}_1$ coupled to the output of the threshold detector $\mathbf{30}_1$. The drive voltage applied to the magnitude drive line $\mathbf{22}_1$ by the threshold detector $\mathbf{30}_1$ triggers the tine delay device $\mathbf{32}_1$ which connects the time drive line $\mathbf{24}_1$ to ground. After a predetermined time delay period, the time delay device $\mathbf{32}_1$ triggers the time delay device $\mathbf{32}_2$ which connects the time drive line $\mathbf{24}_2$ to ground. This cycle is repeated until each of the time delay devices $\mathbf{32}_1$–$\mathbf{32}_m$ have been sequentially triggered to connect each of the time drive lines $\mathbf{24}_1$–24 to ground. It will be appreciated that the time delay period provided by the time delay devices $\mathbf{32}_1$–$\mathbf{32}_m$ may be adjusted so as to produce any desired time scale in the memory matrix 14, as for example a linear or a logarithmic time scale. The time delay devices $\mathbf{32}_1$–$\mathbf{32}_m$ may be provided by any suitable time responsive devices, such as monostable multivibrators.

As a drive voltage is applied to each of the magnitude drive lines $\mathbf{22}_1$–$\mathbf{22}_n$ and as each of the time drive lines $\mathbf{24}_1$–$\mathbf{24}_m$ is connected to ground, the diodes 20 connected between the selected ones of the drive lines are burned out or open circuited by the drive voltage which exceeds the peak voltage rating of the diodes 20. Thus, after the monitored event 10 has taken place, the pattern if the open circuited ones of the diodes 20 in the memory matrix 14 represents the monitored event 10 expressed as a function of magnitude and time. For example, if the signal voltage produced by the transducer 12 is as illustrated in FIG. 2*a*, the pattern of the open circuited ones of the diodes 20 in the memory matrix 14 is as illustrated in FIG. 2*b*. In FIG. 2*a*, the curve 34 represents the signal voltage expressed as a function of magnitude and time. In FIG. 2*b*, $n$=10 and $m$=20 in the memory matrix 14. The X marks at the intersections of the magnitude drive lines $\mathbf{22}_1$–$\mathbf{22}_{10}$ and the time drive lines $\mathbf{24}_1$–$\mathbf{24}_{20}$ indicates the open circuited ones of the diodes 20. The shaded area 36 indicates the limits within the curve 34 must lie. Hence, it will be appreciated that the resolution of the illustrated event recording apparatus is directly related to the number of diodes 20 which are employed within the memory matrix 14.

The information represented within the memory matrix 14 by the open circuited ones of the diodes 20 may be easily recovered by checking the continuity of each of the magnitude drive lines $\mathbf{22}_1$–$\mathbf{22}_n$ against each of the time drive lines $\mathbf{24}_1$–$\mathbf{24}_m$. A lack of continuity indicates an open circuited one of the diodes 20 between the selected ones of the magnitude drive lines $\mathbf{22}_1$–$\mathbf{22}_n$ and the time drive lines $\mathbf{24}_1$–$\mathbf{24}_m$. If desired, this information retrieval could be automatically accomplished by properly programmed equipment.

It will now be appreciated that the subject invention provides a voltage recorder which may be completely constructed in accordance with semiconductor integrated circuit techniques to obtain the dual advantages of increased speed and decreased size. As used in the specification and the claims, the peak voltage rating of the diodes 20 is defined as that voltage which when applied across the diodes 20 develops a current through the diodes 20 equal to the peak current rating of the diodes 20.

What is claimed is:

1. An apparatus for recording a monitored event as a function of magnitude and time, comprising: signal voltage source means including transducer means responsive to the occurrence of the monitored event over time to produce a signal voltage having an instantaneous level corresponding to the instantaneous magnitude of the monitored event; a series of magnitude drive lines arranged in a first order and a series of time drive lines arranged in a second order; a plurality of diodes each connected between a different one of the magnitude drive lines and a different one of the time drive lines to form a memory matrix, the diodes exhibiting a peak voltage characteristic such that each diode is open circuited when a voltage in excess of peak voltage is applied across the diode; magnitude input circuit means connected with the signal voltage source means and including a plurality of threshold detector devices each successively connected to a different associated one of the magnitude drive lines in the first order and each successively responsive to a greater level of the signal voltage to apply a drive voltage in excess of the peak voltage of the diodes to the associated one of the magnitude drive lines; and time input circuit means connected with a voltage reference point and including a plurality of time delay devices each successively connected to a different associated one of the time drive lines in the second order and each successively responsive to a greater interval of time to couple the associated one of the time drive lines to the reference voltage point; whereby the diodes connected between the respective magnitude drive lines and time drive lines are open circuited as the drive voltage is applied to each of the magnitude drive lines and as each of the time drive lines is coupled to the voltage reference point so that the pattern of open circuited diodes within the memory matrix provides a representation of the monitored event expressed as a function of magnitude and time.

2. An apparatus for recording a monitored event as a function of magnitude and time, comprising: signal voltage source means including transducer means responsive to the monitored event for producing a signal voltage having a level corresponding to the magnitude of the monitored event; a series of magnitude drive lines and a series of time drive lines; a plurality of diodes each connected between a different one of the magnitude drive lines and a different one of the time drive lines to form a memory matrix, the diodes exhibiting a peak voltage characteristic such that each of the diodes is open circuited when a voltage in excess of the peak voltage is applied across the diode; magnitude input circuit means connected with the signal voltage source means and including a plurality of threshold detector devices each connected to a different associated one of the magnitude drive lines and each responsive to a different predetermined level of the signal voltage to apply a drive voltage in excess of the peak voltage of the diodes to the associated one of the magnitude drive lines; and time input circuit means connected with a voltage reference point and including a plurality of time delay devices each connected to a different associated one of the time drive lines and each responsive to a different predetermined time interval to couple the associated one of the time drive lines to the reference voltage point; whereby as a drive voltage is applied to each of the magnitude drive lines and as each of the time drive lines is coupled to the voltage reference point, the diodes connected between the respective magnitude and time drive lines are open circuited by the drive voltage so that the pattern of open circuited diodes within the memory matrix provides a representation of the monitored event expressed as a function of magnitude and time.

* * * * *

PO-1050
(5/69)

UNITED STATES PATENT OFFICE
CERTIFICATE OF CORRECTION

Patent No. 3,631,410 Dated December 28, 1971

Inventor(s) Bruce M. Velasco

It is certified that error appears in the above-identified patent and that said Letters Patent are hereby corrected as shown below:

Column 1, line 52, "Figs.2" should be -- Fig. 2a --. Column 2, line 5, "$24_1$ - $22_m$" should be -- $24_1$ - $24_m$ -- line 18, "$30_1$ - 30" should be -- $30_1$ - $30_n$ --; line 45, "at" should be -- as --; line 48, after "detector" insert -- device --; line 56, "$24_1$ - 24" should be -- $24_1$ - $24_m$ --; line 70, "if" should be -- of --. Column 3, line 6, after "within" insert -- which --; line 15, "$24_L$ - $24_m$" should be -- $24_1$ - $24_m$ --; line 17, "$22_L$ - $22_n$" should be -- $22_1$ - $22_n$ --; line 17, "$24_L$ - $24_m$: should be -- $24_1$ - $24_m$ --; line 43, after "of" insert -- the --.

Signed and sealed this 18th day of July 1972.

(SEAL)
Attest:

EDWARD M.FLETCHER,JR.
Attesting Officer

ROBERT GOTTSCHALK
Commissioner of Patents